United States Patent [19]

Mellish

[11] Patent Number: 5,088,871
[45] Date of Patent: Feb. 18, 1992

[54] GRAIN STORAGE UNLOADING APPARATUS

[76] Inventor: Richard L. Mellish, R.D. #1, East Brady, Pa. 16028

[21] Appl. No.: 548,678

[22] Filed: Jul. 5, 1990

[51] Int. Cl.⁵ .......................................... B65G 65/30
[52] U.S. Cl. .............................. 414/327; 198/550.8; 198/735.5
[58] Field of Search ............... 414/325, 327, 523, 528, 414/211, 212, 292, 137.4, 142.2, 133, 308; 198/735.1, 735.5, 550.8, 834; 193/5

[56] References Cited

U.S. PATENT DOCUMENTS

| | | | |
|---|---|---|---|
| 3,044,640 | 7/1962 | Jamison, Jr. | 414/528 |
| 3,208,607 | 9/1965 | Weissmann | 414/308 |
| 3,394,825 | 7/1968 | Reed | 414/308 |
| 3,487,956 | 1/1970 | Schaefer | 414/308 X |
| 3,581,917 | 6/1971 | Fundahn et al. | 414/308 |
| 3,732,960 | 5/1973 | Turner | 193/5 |
| 4,050,575 | 9/1977 | Rossio | 198/834 |

Primary Examiner—David A. Bucci
Assistant Examiner—James Keenary
Attorney, Agent, or Firm—George C. Atwell

[57] ABSTRACT

A movable grain storage unloading apparatus for removing corn and other farm product material from a silo and conveying the corn to an adjacent container. The apparatus includes an elongated horizontal frame section for insertion within a silo, a generally upwardly-inclined frame section attached to the horizontal frame section from which corn is discharged, a pair of laterally-extending guards attached to the upwardly-inclined frame section, and a flat, non-moving conveyor bed extending from a lower reach of the horizontal frame section to an upper reach of the upwardly-inclined frame section and adapted for the conveyance of corn thereon. The apparatus includes a pair of endless linked chains adjacent the conveyor bed with vertically-extended crosspieces secured therebetween, the linked chains adapted for slidable movement on the conveyor bed and the crosspieces adapted for facilitating corn removal by directing the corn therealong. The apparatus is used in combination with a specially configured interior floor having an elongated, rectangular-shaped groove. A plurality of inverted U-shaped tunnel sections are placed on the floor and over the groove, and are adapted for insertably receiving the horizontal frame section. A remote motor control switch with an elongated cable fixed to a motor unit on the apparatus allows control and operation by a workman within or without the silo, and at various distances from the silo.

19 Claims, 5 Drawing Sheets

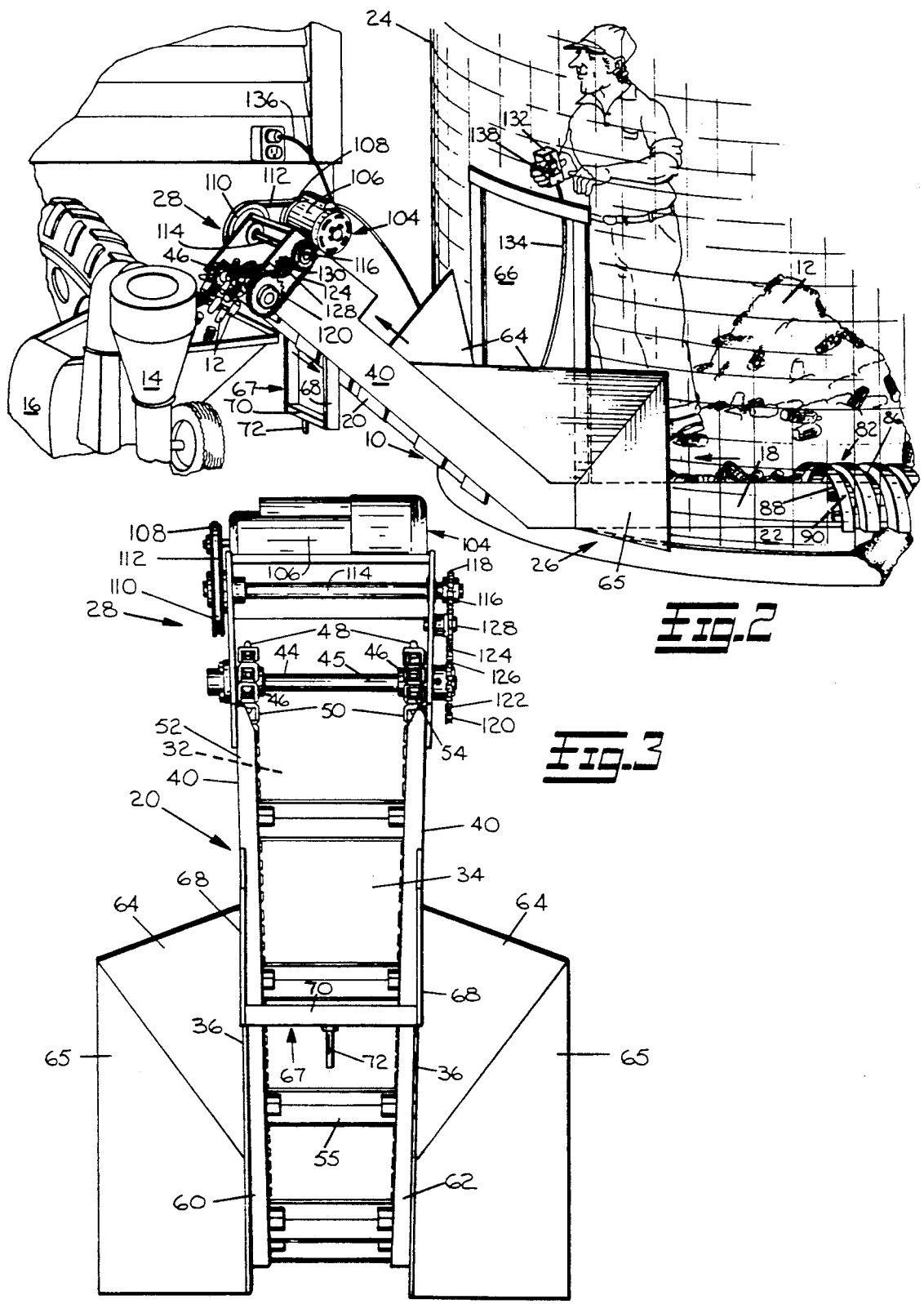

GRAIN STORAGE UNLOADING APPARATUS

BACKGROUND OF THE INVENTION

The present invention relates to agricultural machinery and particularly pertains to a movable, conveyor-type apparatus for unloading corn and other farm product material from a silo or similar structure, and transferring the corn and other material to some type of adjacent container or receptacle.

Among the many chores involved in the occupation of farming, perhaps none is more burdensome and time-consuming than manually unloading corn and other farm product material, by using a shovel or spade, from a silo or simliar structure into an adjacent container or receptacle. A number of different conveyor-type apparatuses have been invented to relieve the farmer of this time-consuming physical drudgery, thus allowing his engagement in more productive activities.

The prior art reveals a number of different conveyor-type apparatuses for unloading and transferring corn and like material from a silo or similar structure into an adjacent container or receptacle. Typical of such apparatus is that disclosed in U.S. Pat. No. 2,601,049 wherein an unloading apparatus has an auger attachment that is horizontally inserted through the silo wall and into the cavity of an inverted elongated U-shaped metal tunnel, whereby the operation of the auger attachment moves corn through the tunnel to an upwardly-inclined tubular structure, and, from there, the corn is discharged into a truck, wagon, or similar receptacle.

Another such device is disclosed in U.S. Pat. No. 4,050,575 which utilizes a belt-type conveyor wherein an endless belt is attached to a pair of end rollers, one roller defining an upper reach and one roller defining a lower reach, and an interconnected drive system to rotatably drive the end rollers. In addition, the apparatus disclosed in U.S. Pat. No. 4,050,575 can be altered from a horizontal to an upwardly-inclined position without requiring additional elements to maintain belt support or tension.

Although each of the devices disclosed in the afore-mentioned art has specific features beneficial for unloading corn and the like from silos or similar structures and thereby relieving farmers of an onerous task, there remains a need for a movable corn unloading apparatus that is safe, simple to maintain, relatively inexpensive to construct, and usable with silos and similar structures having various dimensions.

SUMMARY OF THE INVENTION

The present invention comprehends the use of a movable corn unloading apparatus in combination with a silo or similar structure to unload corn and other farm product material from the silo and transfer it to a wagon, truck, container, or other receptacle.

The structure of the present invention comprises an elongated, horizontal frame section for insertion within a corn silo or like structure and a generally upwardly-inclined frame section which is attached to the horizontal frame section and protrudes outside of the silo. The horizontal frame section culminates at a lower reach, and the upwardly-inclined section culminates at an upper reach wherefrom corn and other material is discharged into a receptacle or container. A flat, rigid, non-moving conveyor bed extends from the upper reach to the lower reach and has an upper surface and a lower surface, the conveyance of the corn occurring only on the upper surface thereof. A pair of spaced-apart, parallel, endless linked chains slidably move on the conveyor bed from the lower reach to the upper reach. Secured transverse to and between the linked chains and adjacent the upper and lower surfaces of the conveyor bed are a plurality of vertically-extending L-shaped crosspieces for moving the corn from the silo to a container-type structure.

The pair of endless linked chains comprise a plurality of square-shaped, connected angle iron members, wherein each angle iron member defines a notch for insertion therethrough of roller teeth. A pair of horizontal roller members, located at the lower reach and the upper reach, respectively, are drivingly integrated to the endless linked chain. The roller members include outwardly-projecting roller teeth that rotatably engage the notches defined by the angle iron members. A motor unit, comprising a gear and pulley system, is integrated with the second roller member and drives the endless linked chain.

Located on the upwardly-inclined frame section are a pair of laterally-extending guards. Each guard also includes a vertically-extending, integrally-attached flange member. When the corn unloading apparatus is in its operative position, the horizontal frame section is inserted into the corn silo through the open corn silo door. Since the silo is stocked with corn, opening the silo door causes a quantity of corn to spill out onto the ground. The purpose of the guards and the attached flanges is to form a barrier across the open door or entrance way of the silo in order to block the spillage of corn through the door and onto the ground. It has been discovered that when the guards with the attached flanges are placed adjacent and, if possible, contiguous to the sides of the silo door or entrance way, corn spillage through the silo door is generally eliminated.

In the preferred embodiment of the invention, a plurality of inverted U-shaped tunnel sections are placed on the interior surface of an empty corn silo in such a manner that one tunnel section overlaps a small portion of another tunnel section. The tunnel sections are preferably constructed of a pliable plastic material for ease in placement and removal. The tunnels are placed linnearly, from the back of the silo to the front, concave side down, such placement defining a cavity for receiving the horizontal frame section. A gap is left between the open silo door and the tunnel section adjacent to the silo door. This is done so that a certain amount of corn or other material can intersect the exposed portion of the conveyor bed and begin movement on the bed and out of the silo. The corn silo is then stocked to a desirable height with corn. When the silo is ready to be emptied, the silo door is opened and the horizontal frame section is inserted through the open door and into the cavity formed by the inverted placement of the tunnel sections. The apparatus is now in its operative position and emptying of the corn or like material can commence.

An additional feature is a hand-held on-off motor control switch for controlling the operation of the apparatus. Two cables of approximately 20 feet in length are attached to the motor unit: one which can plug into an outdoor or an indoor electrical outlet; and the other cable which terminates at the hand-held motor control switch for turning the apparatus on or off. The motor control switch is small and rectangular and has a backside prong for hooking it onto one's belt. The advantage of such a hand-held motor control switch is apparent: once inside the silo, the farmer, with the hand-held motor control switch secured to his belt, can exercise control over the running of the corn unloading apparatus, obviating the necessity of continually leaving and re-entering the silo to turn the apparatus off and on as the progress of work requires.

It will become apparent in the following detailed description, and revealed in the accompanying drawings, that there are additional specific details of the structure of the presently preferred embodiment of the invention that will enhance an appreciation of the advantages and characteristics of the disclosed invention.

BRIEF DESCRIPTION OF THE DRAWINGS

FIG. 2 is a side perspective view of the preferred embodiment of the apparatus first shown in FIG. 1, showing the apparatus, in combination with other structures, disposed in its operative position;

FIG. 3 is a rear elevational view of the apparatus of the invention first shown in FIG. 1, showing certain elements located on the underside of the apparatus;

DETAILED DESCRIPTION OF THE PREFERRED EMBODIMENT

Figure 1:
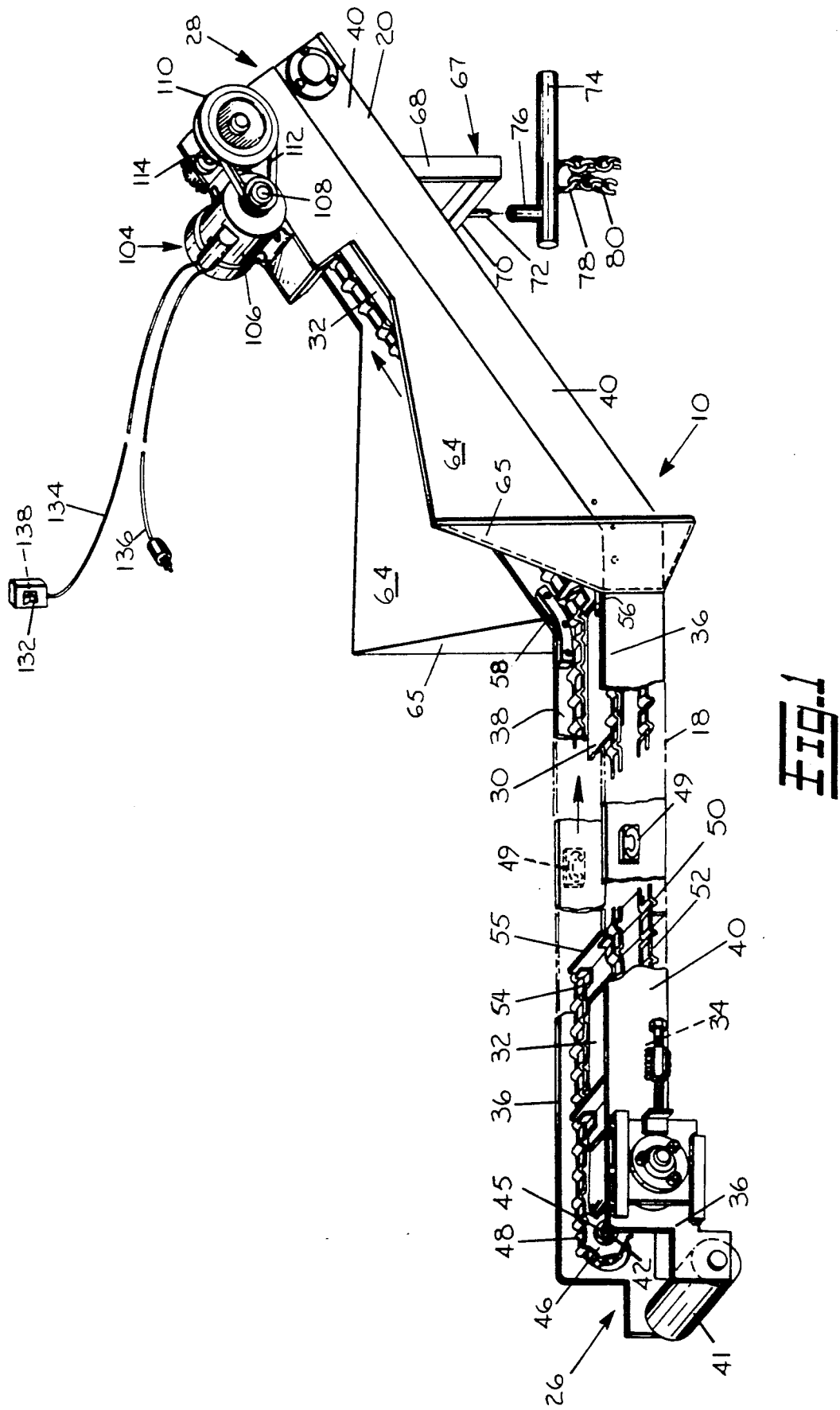
FIG. 1 is a side perspective view of a movable corn unloading apparatus according to the preferred embodient of the present invention, with portions of the apparatus shown in cutaway view.

FIG. 1 illustrates a movable corn unloading apparatus 10 for use in removing corn 12 and other material, generally farm product material, from a silo or similar structure and conveying the corn 12 to a waiting and adjacent container, wagon, truck, or, as shown in FIG. 2, a cyclone-shaped corn grinder 14 with an attached bin 16. The movable corn unlading apparatus 10 includes an elongated horizontal frame section 18 and a generally upwardly-inclined frame section 20 integrally attached to the horizontal frame section 18 and generally located in the same vertical plane as the horizontal frame section 18. In the preferred embodiment of the present invention, the upwardly-inclined frame section 20 will have an upward slope of generally 33 degrees from the horizontal. The movable corn-unloading apparatus 10 is constructed of durable steel, and adapted for year-round use in, mainly, a farm-type environment. As shown more specifically in FIG. 2, the elongated horizontal frame section 18 is adapted for insertion within an interior floor 22 of a corn silo 24 (as shall hereinafter be further described) the insertion being superjacent to the interior floor 22.

As illustrated in FIG. 1, the horizontal frame section 18 culminates at a lower reach 26 and the generally upwardly-inclined frame section 20 culminates at an upper reach 28. The lower reach 26 and the upper reach 28 substantially define the length of the corn unloading apparatus 10. The point of deepest insertion within the corn silo 24 is defined generally by the lower reach 26, while the upper reach 28, generally, defines the area from which corn 12 and similar material is discharged into a waiting receptacle or container. As shown in FIG. 2, for example, the waiting receptacle is a cyclone-shaped corn grinder 14 with an attached bin 16. The movement or conveyance of corn 12 from the silo 24 to a waiting container, wagon, or corn grinder 14 with attached bin 16 (shown in FIG. 2) is in a lower to upper manner as indicated by the arrows illustrated in FIGS. 1 and 2.

As shown in FIG. 1, extending the full length of the movable corn unloading apparatus 10, from the lower reach 26 of the horizontal frame section 18 to the upper reach 28 of the upwardly-inclined frame section 20, is a flat, rigid, non-moving conveyor bed 30. The conveyor bed 30 has a flat upper surface 32 and a flat lower surface 34, the upper surface 32 being the surface upon which the corn 12 and similar material is conveyed therealong. As shown in FIG. 1, the conveyor bed 30 generally conforms to the horizontal extension of the horizontal frame section 18 and the upward activity of the upwardly-inclined frame section 20.

A pair of oppositely-disposed conveyor support sides 36 extend from the lower reach 26 to the upper reach 28. As shown in FIG. 1, the conveyor support sides 36 are vertically-projecting and secured to the conveyor bed 30. The vertically-projecting conveyor support sides 36 prevent corn 12 and other material from spilling off the conveyor bed 30 as the corn 12 is being conveyed therealong when the apparatus is disposed in its operative position by maintaining the corn 12 within the support sides 36 of the conveyor bed 30.

Figure 4:
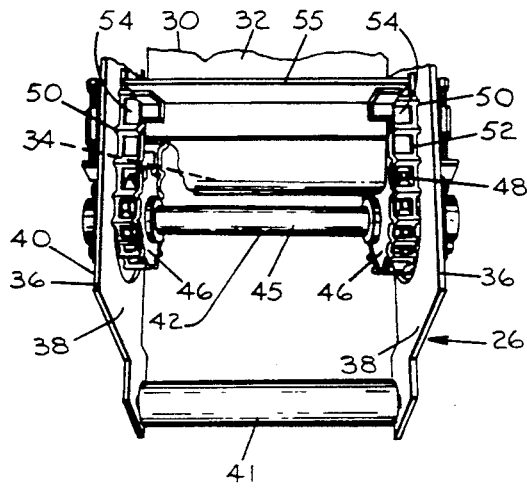
FIG. 4 is a fragmentary view taken from a downward perspective of the lower reach of the apparatus of the invention first shown in FIG. 1.
Figure 5:
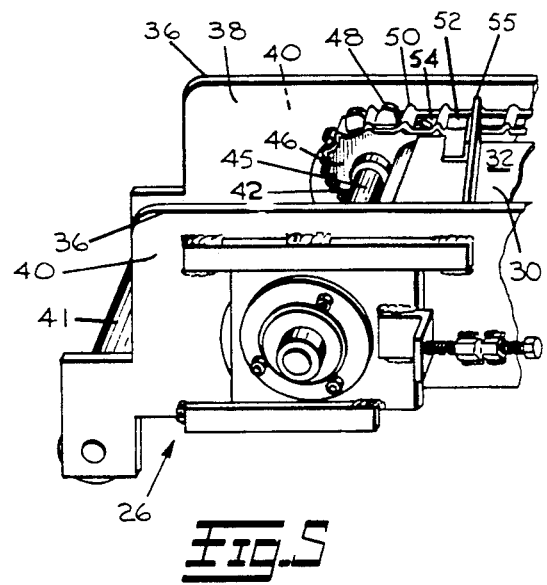
FIG. 5 is a fragmentary side perspective view of the apparatus first shown in FIG. 5.

In FIGS. 4 and 5, the conveyor support sides 36 are shown in relation to other elements of the preferred embodiment of the present invention, which will be hereinafter further described. In addition, as illustrated in FIGS. 1, 4 and 5, each conveyor support side 36 is further characterized by an inner support surface 38 and an outward support surface 40. In addition, a horizontally-extending surface roller 41 is transversely and rotatably secured to the support sides 36 at the lower reach 26. The purpose of the surface roller 41 is to reduce the friction of the horizontal frame section 18 during slidable insertion upon the floor 22 of the silo 24 (hereinafter further described).

As illustrated in FIGS. 1 and 3, there are shown a pair of roller members 42 and 44 located, respectively, generally at the lower reach 26 and upper reach 28. FIGS. 4 and 5 more specifically illustrate the roller member 42 located at the lower reach 26. Each roller member 42 and 44 includes a horizontal roller shaft 45 with the axial direction of the shaft 45 generally transverse to the vertically-projecting support sides 36. The roller shafts 45 extend therebetween and are rotatably secured to the vertically-projecting conveyor support sides 36. As illustrated in FIGS. 3, 4, and 5, the roller members 42 and 44 also include, located adjacent the inner surfaces 38 of the vertically-projecting conveyor support sides 36 and at the ends of the roller shafts 45, a pair of oppositely-disposed roller gear assemblies 46. The roller gear assemblies 46 are generally circular in shape and are secured for rotation therewith to the roller members 42 and 44, each roller gear assembly 46 having a plurality of circumferentially-attached outwardly-projecting roller teeth 48.

As illustrated in FIG. 1, a pair of rigid, U-shaped oppositely-disposed chain inserts 49 are fixed to the outward support surface 40 of each conveyor support side 36 at the pivot point, which is located generally midway on the horizontal frame section 18. In the preferred embodiment of the present invention, each chain insert 49 is horizontally fixed at the outward support surface 40 of each conveyor support side 36 by a pair of prong ends integrally formed from the U-shaped chain inserts 49. The U-shaped chain inserts 49 further define a slot for insertion therethrough of a heavy-gauge chain; the purpose for inserting the chain through the chain inserts will be hereinafter more fully described.

An alternate embodiment of the chain inserts can be a pair of oppositely-disposed rigid, chain projecting members, with each projecting member fixed to the outward support surface 40 of each conveyor support side 36 at a first end and having a second end inwardly curving toward, but not coming in contact with, the outward support surface 40 of each conveyor support side 36. The links of the heavy-gauge chain can be inserted through a gap defined by the area between the outward support surface 40 of each conveyor support side 36 and the projecting member's second end. Then, the chain can be slidably mounted or attached on the projecting member, the purpose for such mounting shall be hereinafter more fully described.

As illustrated in FIGS. 1 and 4, there is shown a pair of spaced-apart parallel endless linked chains 50 adjacent to the upper surface 32 and lower surface 34 of the conveyor bed 30 and also adjacent the inner surfaces 38 of the conveyor support sides 36. When the apparatus is disposed in its operative position as shown in FIG. 2, the pair of endless linked chains 50 are adapted for slidably moving thereon in a lower to upper manner, more specifically, from the lower reach 26 to the upper reach 28. As shown in FIGS. 1 and 4, the pair of spaced-apart endless linked chains 50 are oppositely-disposed one another and drivingly-integrated with the roller gear assemblies 46 of the roller members 42 and 44. As shown in FIGS. 4 and 5, the pair of endless linked chains 50 also include a plurality of square-shaped angle iron members 52, each angle iron member 52 defining a notch 54 for insertion therethrough by the roller teeth. When the apparatus is disposed in its operative position, as shown in FIG. 2, the roller teeth 48 rotatably engage the notches 54 in the angle iron members 52, thus, facilitating the slidable movement of the endless linked chain 50 upon the conveyor bed 30.

In addition, as illustrated in FIGS. 1, 4, and 5, a plurality of vertically-projecting, spaced-apart conveyor crosspieces 55 are located adjacent and transverse to the conveyor bed 30, and extend between and are secured to the pair of parallel, endless linked chains 50. The height of the conveyor crosspieces 55 are generally equal to the height of the conveyor support sides 36, and the crosspieces are spaced therealong the linked chains 50 at intervals of several feet.

When the corn unloading apparatus 10 is disposed in its operative position, the slidable movement of the pair of linked chains 50 upon the conveyor bed 30 also causes the conveyor crosspieces 55 to move in tandem with the linked chains 50. Corn 12 being removed from the silo 24 falls into the gaps of the spaced-apart conveyor crosspieces 55 and in consequently conveyed therealong to eventual discharge from the upper reach 28 of the upwardly-inclined frame section 20.

FIG. 1 shows a pair of oppositely-disposed upper surface guards 56 and 58 positioned generally at the area of connection between the horizontal frame section 18 and the generally upwardly-inclined frame section 20. The upper surface guards 56 and 58 are located adjacent to each inner surface 38 of the support sides 36 and are secured thereon. The upper surface guards 56 and 58 are adapted from maintaining the pair of linked chains 50 upon the conveyor bed 30 while the pair of linked chains 50 are slidably moving from the horizontal frame section 18 to the generally upwardly-inclined frame section 20, in a lower to upper manner, when the apparatus 10 is disposed in its operative position.

As illustrated in FIG. 3, there is shown a pair of oppositely-disposed parallel lower surface guards 60 and 62. The lower surface guards 60 and 62 are dependingly attached to the support sides 36 and are generally L-shaped in construction. The lower surface guards 60 and 62 are adapted to support and partially cover the pair of linked chains 50 in order to protect the farmer or workman when the apparatus is disposed in its operative position, and the pair of linked chains 50 are slidably moving from the upper surface 32 to the lower surface 34.

In FIGS. 1 through 3, there is shown a pair of laterally-extending containment guards 64 secured to the support sides 36 of the upwardly-inclined frame section 20. The containment guards 64 are triangular-shaped, as shown in FIGS. 1, 2, and 3; but the shape can be adapted to accommodate corn silos and similar structures of various sizes and shapes and also to accommodate various-sized doors or openings. The guards 64 also include a pair of integrally-attached, vertically-extending flange members 65 for abutting an exterior sidewall of the silo 24. More specifically, when the apparatus 10 is disposed in its operative position, as shown in FIG. 2, the laterally-extending containment guards 64 are placed or positioned adjacent an entrance way 66 of the silo 24, and each flange member 65 abuts the exterior sidewall of the silo 24. Thus, during removal of the corn 12 from the silo 24, the laterally-extending containment guards 64 and flange members 65 block the spillage of corn through the open door or entrance way 66 of the corn silo 24, as shown in FIG. 2. In this way, corn spillage through the entrance way 66 is generally eliminated.

FIGS. 1 through 3 illustrate a downwardly-projecting alignment member 67 secured to the support sides 36. More specifically, the downwardly-projecting alignment member 67 includes a pair of oppositely-disposed, downwardly-projecting bars 68, and extending therebetween and secured to the downwardly-projecting bars 68 is a horizontal cross bar 70. Positioned substantially toward the center of the horizontal cross bar 70 is a downwardly-projecting alignment pin 72. More specifically, as shown in FIG. 1, an elongated, cylindrical, hollow alignment sleeve 74 is adapted to be removably inserted on the alignment pin 72. Furthermore, the elongated, cylindrical, hollow alignment sleeve 74 has an attached laterally-extending member 76 defining a chamber for insertably receiving the alignment pin 72. In addition, a U-shaped member 78 is secured to the sleeve 74 so that when the alignment sleeve 74 is in its operative position, the U-shaped member 78 projects downwardly so that a flexible heavy-duty chain 80 can be attached, as indicated in FIG. 1.

The purpose of the alignment member 67 is to facilitate the insertion of the movable corn unloading apparatus 10 into a specially-configured interior floor (hereinafter further described) of the corn silo 24. When the apparatus is ready to be disposed in its operative position, the door or horizontal barriers that extend across the entrance way 66 of the corn silo are removed, and the horizontal frame section 18 is inserted through the entrance way 66 of the corn silo 24 and into the interior of the silo 24. The manner by which the horizontal frame section 18 is inserted is by having a tractor or other piece of heavy farm equipment (not shown) wielding some type of rigid, projecting bar or rod (also not shown) which is capable of insertion within the elongated, cylindrical alignment sleeve 74. As contemplated in the preferred embodiment of the present invention, the alignment sleeve 74 is slidably inserted on the bar or rod of the tractor or piece of heavy fram equipment, and then the tractor or farm equipment maneuvers the alignment sleeve 74 so that the laterally-extending member 76 of the alignment sleeve 74 can be inserted into the alignment pin 72 of the corn unloading apparatus 10.

FIG. 2 more specifically shows the disposition of the horizontal frame section 18 of the apparatus 10 after insertion through the entrance way 66, the insertion being superjacent the interior floor (hereinafter further described) of the corn silo 24. The apparatus 10 is first positioned so that the horizontal frame section 18 is aligned with the entrance way 66. This is accomplished by wrapping or tying the heavy-duty chain 80 around the horizontal frame section 18 and securing it to the U-shaped member 78. The heavy-duty chain 80 is further secured by first slipping it through the chain inserts 49 and around the horizontal frame section 18. This prevents the chain 80 from moving or sliding along the frame section 18, thus causing the apparatus 10 to become unbalanced during moving and repositioning. Furthermore, if the apparatus 10 must be dragged, this is more easily accomplished by looping the chain 80 through each chain insert 49, and then attaching the chain 80 to a projecting rod, bar, or other type of structure on the farm equipment. The alignment sleeve 74 is then slidably attached to the bar or rod on the adjacent tractor or piece of heavy farm equipment. The entire movable corn unloading apparatus 10 is then physically lifted and positioned with the horizontal frame section 18 adjacent the open door or entrance way 66.

After the door or entrance way 66 is opened and the apparatus 10 is appropriately positioned, the chain 80 is unhooked from the U-shaped member 78 and removed, and the tractor is then maneuvered so that the laterally-extending member 76 of the alignment sleeve 74 can be slidably inserted over the alignment pin 72. The tractor then pushes the horizontal frame section 18 through the open door or entrance way 66 and slides it across the interior floor of the corn silo 24 to its full extension so that the flange members 65 of the laterally-extending containment guards 64 abut the sidewall of the corn silo 24 and the upwardly-inclined frame section 20 projects outwardly therefrom the exterior of the silo 24. Surface friction during the sliding is reduced and insertion is facilitated by the rolling motion of the surface roller 41 upon the interior floor of the corn silo 24.

In addition, the alignment sleeve 74 can also be used to reposition the movable corn unloading apparatus 10 to locations in front of other corn silos or similar structures. This is done by attaching the heavy-duty chain 80 through the chain inserts 49 and around the horizontal frame section 18 and connecting it to the U-shaped member 78 of the alignment sleeve 74. The alignment sleeve 74 is then attached to a bar or rod on a farm tractor or heavy equipment and, thus, the apparatus 10 is capable of being lifted or slid to other positions adjacent to other corn silos or similar structures in the manner previously described.

Figure 7:
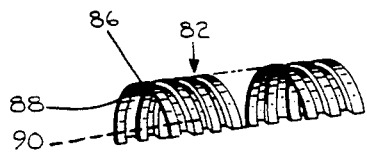
FIG. 7 is a perspective view of certain elements first shown in FIG. 2.
Figure 8:
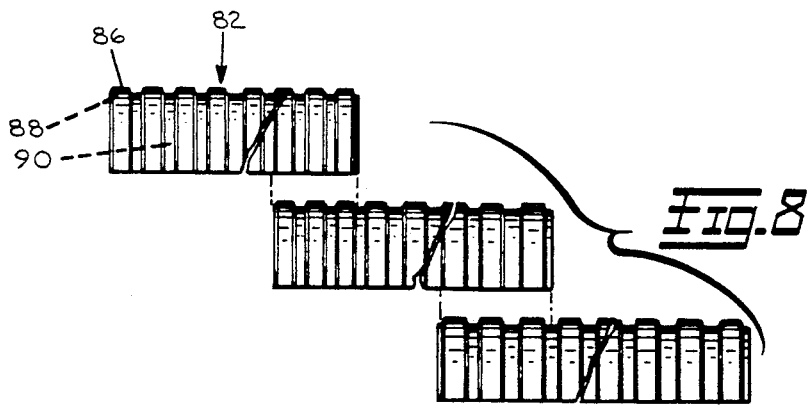
FIG. 8 is a side elevational view of certain elements first shown in FIG. 7.

FIG. 7 and FIG. 8 illustrate a plurality of insertably-removable, inverted U-shaped tunnel sections 82. In the preferred embodiment of the present invention, the tunnel sections 82 are constructed from pliable, plastic culvert sections. The culvert sections are generally 24 inches in diameter. They are first cut in half, and then cut lengthwise into three-foot sections. The tunnel sections 82 are adapted to facilitate the removal and emptying of corn or other material from the silo 24.

Figure 6:
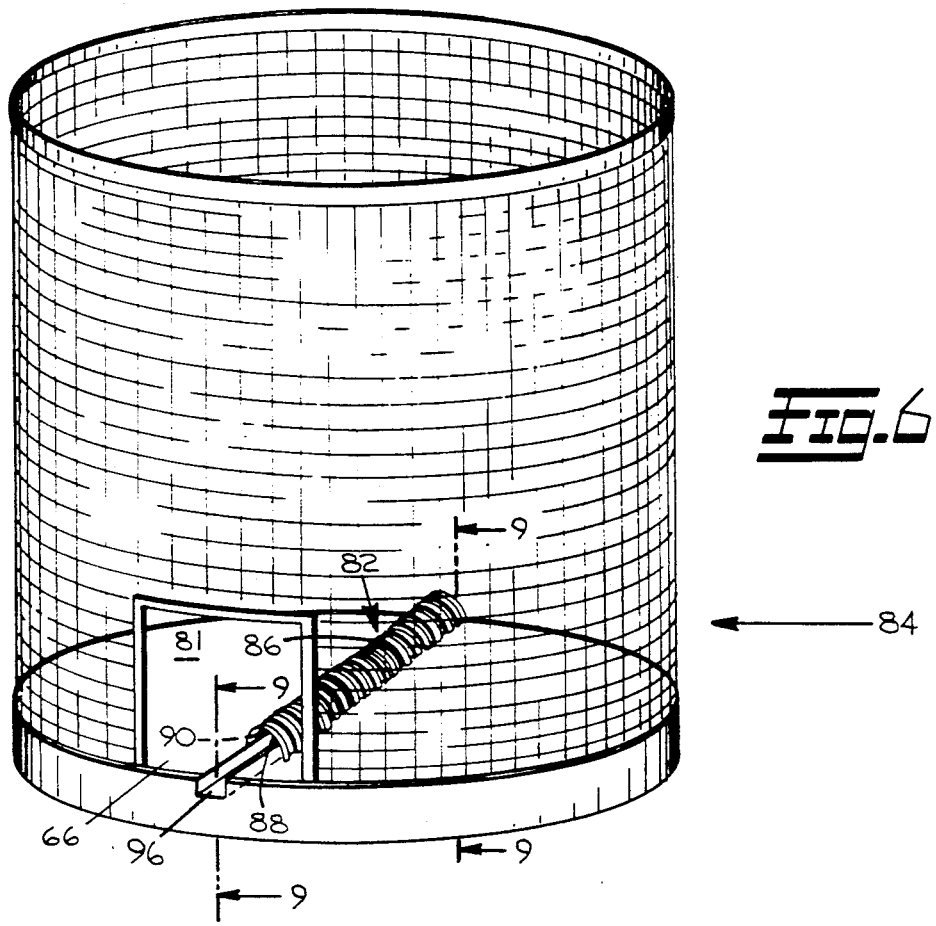
FIG. 6 is a frontal perspective view of the preferred embodiment of the present invention first shown in FIG. 2, showing the disposition of certain elements.

FIG. 6 shows an empty corn silo 84. Before the silo 84 is filled with corn or other material, the U-shaped tunnel sections 82 are placed on the specially-configured interior surface or floor (hereinafter more fully described) of the silo 84 in a linear arrangement. More particularly, as shown in FIG. 6, the U-shaped tunnel sections 82 are invertibly placed on the specially-configured interior floor or surface of the corn silo 84, and are aligned generally starting adjacent with the entrance way 66, and stretching back to an opposite interior wall. The invertible placement of the tunnel sections 82 on the interior floor or surface of the empty silo 84 or similar structure, creates an upwardly-facing convex portion 86 and a downwardly-facing convex portion 88. The downwardly-facing convex portion 88 further defines an elongated cavity 90.

However, a small gap is left between the entrance way 66 and the tunnel section 82 placed closest thereto. When the silo 24 is filled with the corn 12, as shown in FIG. 2, an initial quantity of corn 12 will intersect the horizontal frame section 18 and the interior floor of the corn silo 24 in order to begin the initial removal of the corn 12 from the silo 24. Also, as will be more fully described hereinafter, the tunnel sections 82 are linearly placed over and above a narrow ditch or groove, as shown in FIG. 6, the narrow ditch or groove extending the full diameter of the interior floor or surface of the silo 84.

As illustrated in FIG. 2, in order for the apparatus 10 to be disposed in its operative position, the apparatus 10 must first be aligned with the entrance way 66 of the corn silo 24 before the horizontal frame section 18 can be slid through the open entrance way 66 and positioned superjacent the interior floor or surface of the corn silo 24. The horizontal frame section 18 is aligned with the invertibly and linearly placed tunnel sections 82, and is slid within the cavity 90 defined by the downwardly-facing concave portion 88 of the tunnel sections 82. As shown in FIG. 2, substantially all of the horizontal frame section 18 is inserted within the interior of the corn silo 24.

When the apparatus is disposed in its operative position, the pair of laterally-extending containment guards 64, as illustrated in FIG. 2, are placed or positioned adjacent the open entrance way 66, and the flange members 65 abut the exterior sidewalls of the silo 24 in order to block and eliminate the spillage of corn or other material out from the corn silo 24 and onto the ground. After insertion of the horizontal frame section 18 within the corn silo 24 and superjacent the interior surface or floor of the silo 24, such insertion also being within the cavity 90 defined by the concave portion 88 of the tunnel sections 82, removal of the corn 12 can commence. FIG. 2 shows the corn 12 being directed along the conveyor bed 30 from the horizontal frame section 18 to the generally upwardly-inclined frame section 20 in a lower to upper manner, as indicated by the directional arrow(s). The corn 12 is being discharged into a cyclone-shaped corn grinder 14 from the generally upper reach 28 of the upwardly-inclined frame section 20.

Figure 9:
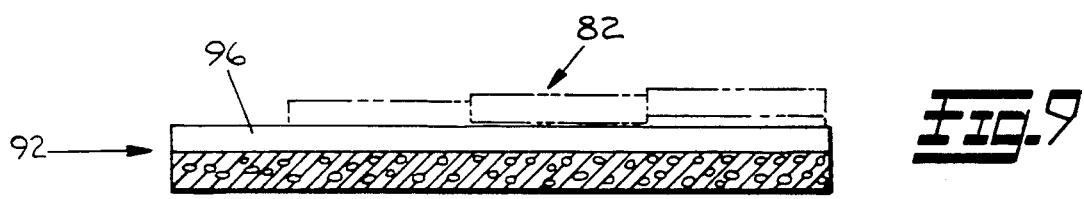
FIG. 9 is an elevational side view of the presently preferred embodiment of the specially-configured interior silo floor.
Figure 10:
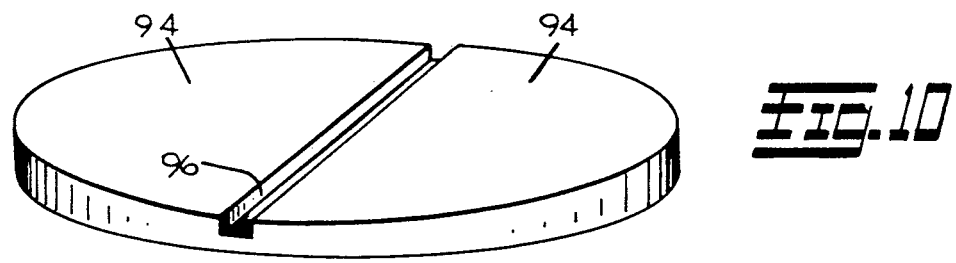
FIG. 10 is a front perspective view of the apparatus first shown in FIG. 9.

FIGS. 9 and 10 illustrate a preferred embodiment for the specially-configured interior floor of the present invention. More specifically, FIGS. 9 and 10 illustrate a specially-configured circular silo floor 92 having oppositely-disposed sides 94. The oppositely-disposed sides 94 of the circular silo floor 92 slope downward and inward to an elongated, rectangular-shaped groove 96 extending the diameter of the circular silo floor 92. The rectangular-shaped groove 96 is also adapted for slidably receiving the horizontal frame section 18, and, thus, the rectangular-shaped groove 96 is of an adequate width and depth to receive the slidably inserted horizontal frame section 18.

Figure 11:
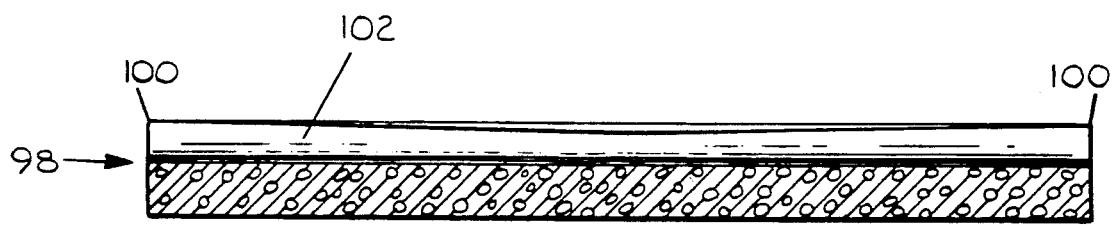
FIG. 11 is an alternative preferred embodiment of the apparatus first shown in FIG. 9 shown in a side elevational view.
Figure 12:
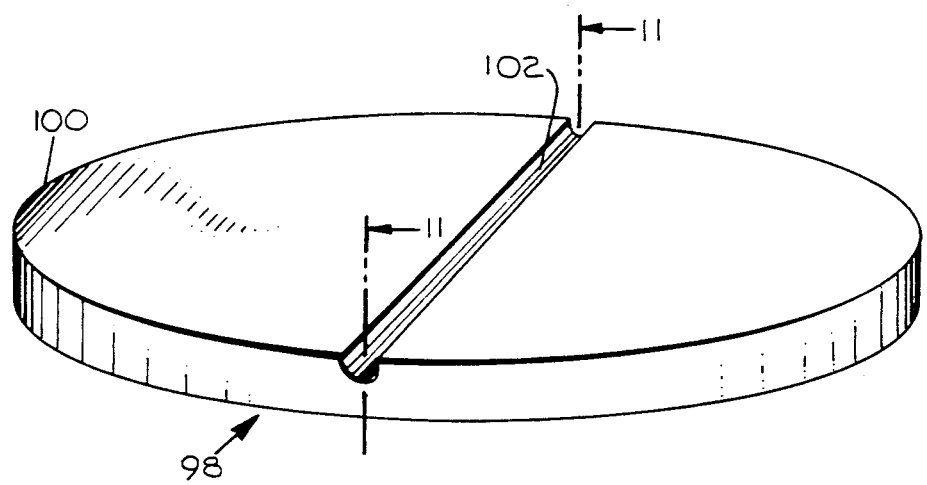
FIG. 12 is a frontal view from a downward perspective of the apparatus first shown in FIG. 11.

FIGS. 11 and 12 illustrate an alternate embodiment of the specially-configured interior floor of the present invention. More specifically, FIG. 11 illustrates the specially-configured interior floor 98 for use in combination with the corn unloading apparatus 10 and silo 24 shown in FIG. 2. The interior floor 98 slopes radially downward and inward from a circumferential edge 100. The downward and inward slope of the interior floor 98 converges generally at a point which is lower than the circumferential edge 100. In FIG. 12, a longitudinally-extending, concave-shaped drainage ditch 102 is shown. The drainage ditch 102 is recessed within and extends the full diameter of the interior floor 98 of the corn silo 24. Moreover, the upwardly-opening, concave-formed drainage ditch 102 is adapted to follow the downward and inward radial slope of the interior floor 98 of the corn silo 24. Further, the drainage ditch 102 is of a sufficient width to allow slidable reception of the horizontal frame section within the drainage ditch.

FIGS. 2 and 3 illustrate a motor unit 104 fixedly located toward the upper reach 28 and on the generally upwardly-inclined frame section 20. The motor unit 104 is a standard gear reduction-and-pulley system. In the preferred embodiment of the present invention, the motor unit 104 includes a one-horsepower motor 106 located above and transverse to the upper surface 32 of the conveyor bed 30 on the upwardly-inclined frame section 20. As illustrated in FIG. 1, the conveyor support sides 36 have a greater vertical projection at the upper reach 28 of the upwardly-inclined frame section 20, therefore permitting securement of the motor unit 104 a sufficient distance above the upper surface 32 of the conveyor bed 30, thus allowing the unimpeded conveyance of corn 12 and other material therealong when the apparatus is disposed in its operative position.

Adjacent to the outer support surface 40 of one of the conveyor support sides 36, and located generally toward the upper reach 28, as illustrated in FIG. 1, is a circular small adjustable pulley 108 and a large circular pulley 110. The small adjustable pulley 108 is rotatably secured to the motor unit 104, and the small adjustable pulley 108 and the large pulley 110 are connected by an endless pulley belt 112 circumferentially attached thereto for reciprocal rotation. Rotatably attached, at one end, to the large pulley 110 is a pulley drive shaft 114. The pulley drive shaft 114 extends transverse to the vertically-projecting conveyor support sides 36 and extends above the conveyor bed 30 and between and through the conveyor support sides 36 and is rotatably secured thereto.

Located on the oppositely-disposed outer support surface 40 is a small driving sprocket 116, as shown in FIG. 2. Furthermore, the small driving sprocket 116 is rotatably secured to the opposite end of the pulley drive shaft 114, as illustrated in FIGS. 2 and 3. The small driving sprocket 116 is circularly shaped and has a plurality of circumferentially-projecting small sprocket teeth 118. As shown in FIG. 3, positioned beneath the small driving sprocket 116 is a large driving sprocket 120. The large driving sprocket 120 is also positioned on the outer support surface 40 of the conveyor support side 36 and is rotatably secured to the horizontal shaft 45 of the roller member 44 located at the upper reach 28. The large driving sprocket 120 is also circulary shaped and has the plurality of circumferentially-projecting large sprocket driving teeth 122.

As illustrated in FIG. 2, attached to the small driving sprocket 116 and the large driving sprocket 120 is a sprocket drive chain 124, the sprocket drive chain 124 having sprocket notches 126 which allow insertion therethrough, by the sprocket teeth 118, of the small driving sprocket 116 and the sprocket teeth 122 of the large driving sprocket 120. In addition, a circularly-shaped guide sprocket 128, with circumferentially-projecting guide sprocket teeth 130 thereon, is located on the outer support surface 40 at the generally upper reach 28 of one of the conveyor support sides 36. Further, the guide sprocket 128 is positioned lateral to the small driving sprocket 116, and above the large driving sprocket 120. The guide sprocket 128 is located outside of the path of the sprocket drive chain 124, but the guide sprocket 128 is placed so that the guide sprocket teeth 130 drivingly engage the sprocket drive chain 124 when the apparatus is disposed in its operative position. The positioning of the guide sprocket 128 provides tension to the sprocket drive chain 124 and thus facilitates its efficient rotation around the small driving sprocket 116 and the large driving sprocket 118.

When the apparatus as shown in FIGS. 1, 2, and 3 is disposed in its operative position and the motor unit 104 is powered on, the attached small adjustable pulley 108 commences to rotate. The rotation of the small adjustable pulley 108 is reciprocally translated to the large pulley 110 by the endless pulley belt 112. The rotation of the large pulley 110, in turn, causes the pulley drive shaft 114 to rotate about its axis, thus causing the small driving sprocket 116, which is oppositely attached thereto, to rotate counterclockwise. The rotation of the small driving sprocket 116 thus causes the drivingly-engaged sprocket drive chain 124 to move in its circumferential path around the small driving sprocket 116 and the large driving sprocket 120. Thus, the counterclockwise rotation of the large driving sprocket 120 translates rotatable motion to the roller member 44 located at the upper reach 28, and the roller member 44 of the upper reach 28 begins turning on an axis transverse to the conveyor support sides 36.

Consequently, the outwardly-projecting roller teeth 48 successively and rotatably engage notches 54 on the pair of endless linked chains 50. This continuous and successive rotatable engagement of the roller teeth 48 through the notches 54 on the pair of endless linked chains 50 causes the slidable movement of the pair of endless linked chains 50 and the conveyor crosspieces 55 upon the upper surface 32 and lower surface 34 of the conveyor bed 30, in a lower to upper manner, respectively. As a result, when the apparatus is disposed in its operative position as shown in FIG. 2, corn 12 and other material is conveyed from the lower reach 26 and along the upper surface 32 of the conveyor bed 30 to the upper reach 28 where the corn 12 is then discharged into a waiting container, receptacle, truckbed, or, as shown in FIG. 2, a cyclone-shaped corn grinder 14 with an attached bin 16.

As illustrated in FIGS. 1 and 2, an additional feature of the presently preferred embodiment of the apparatus is a handheld, remote motor control switch 132 for controlling the running and operation of the motor unit. The handheld, remote motor control switch 132 is attached to the one-horsepower motor 106 of the motor control unit 104, by a first elongated cable 134 at least 20-foot long and of the appropriate electrical gauge. A second elongated cable 136 of approximately the same length plugs into any standard electrical outlet or receptacle. The remote motor control switch 132 has a backside prong 138 which enables the farmer or workman to attach the remote motor control switch 132 to his belt or some other article of clothing. As shown in FIG. 2, the advantage of the remote motor control switch 132 is manifest.

When the apparatus is disposed in its operative position, as shown in FIG. 2, the farmer or workman is located inside the silo 24 assisting in corn removal by steadily and slowly shoveling the heapted corn 12 or other material downward toward the inverted tunnel sections 82 and the horizontal frame section. Without the remote motor control switch 132, the farmer or workman would be required to leave the corn silo 24 in order to turn the corn unloading apparatus 10 on or off. During the course of a working day, this could necessitate many work interruptions. However, with the remote motor control switch 132, the farmer or workman need not leave the corn silo because the remote motor control switch 132 permits control and operation of the apparatus from inside the corn silo 24. Thus efficiency and ease in operation are achieved by the remote motor control switch 132. It should also be noted that the length of the first cable 134 and the second cable 136 can vary, and cables of more than 20 feet in length may be useful and even necessary, depending upon the circumstances of the particular use of the apparatus 10, the dimensions of the silo, and the location of electrical outlets.

Although a particular preferred embodiment of the apparatus has been disclosed above for illustrative purposes, it should be understood that alterations, adaptations or modifications shall be included within the scope of the appended claims.

I claim:

1. A movable corn unloading apparatus for the conveyance of corn thereon comprising:

an elongated horizontal frame section, having a length substantially equal to the diameter of a silo, and culminating at a lower reach, the full length of said frame section being insertable in an interior floor of the silo;

a generally upwardly-inclined frame section attached to the horizontal frame section having an upper reach from which material is unloaded into a container;

a flat, rigid, non-moving conveyor bed, extending from the lower reach of the horizontal frame section to the upper reach of the upwardly-inclined frame section, having an upper surface and a lower surface, the upper surface facilitating the conveyance of material thereon;

a pair of oppositely-disposed, vertically-projecting conveyor support sides having an inner support surface and an outer support surface, the support sides secured to the conveyor bed and extending from the upper reach to the lower reach, for containing material on the upper surface of the conveyor bed;

a pair of spaced-apart, parallel endless linked chains adjacent the upper surface and lower surface of the conveyor bed and slidably moving thereon in a lower to upper manner, to convey the corn along the said conveyor bed;

a pair of vertically and laterally-extending containment guards secured to the support sides of the upwardly-inclined frame section for adjacent positioning to an entrance way of the corn silo to prevent spillage of corn through the entrance way;

a pair of vertically-extending flange members, each flange member integrally attached to the containment guards, and abutting an exterior sidewall of the silo when the apparatus is disposed in an operative position;

a downwardly-projecting alignment member secured to the support sides and positioned substantially toward the upper reach of the conveyor bed and adjacent the lower surface for facilitating insertion of the horizontal frame section within the silo; and a pair of roller members located generally at the lower reach and the upper reach, respectively, the roller members transversely extending between the support sides and secured to the support sides and rotatably integrated with the endless linked chain for facilitating the slidable movement of the linked chain upon the conveyor bed.

2. The apparatus of claim 1 wherein the roller members include outwardly-projecting roller teeth for rotatably engaging the linked chains, the roller teeth positioned adjacent the inward surface of the support sides and at the ends of the roller members.

3. The apparatus of claim 1 wherein each roller member includes a horizontal roller shaft, the axial direction of the shaft transverse to the support sides and rotatably secured thereto.

4. The apparatus of claim 1 wherein the endless linked chains include a plurality of square-shaped angle iron members which define a notch for insertion therethrough by the roller teeth.

5. The apparatus of claim 1 including a means for insertion of the horizontal frame section within the interior of the silo, insertion being superjacent the floor of the silo.

6. The apparatus of claim 5 wherein the insertion means includes a plurality of insertably-removable, U-shaped tunnel sections for invertible placement on the floor of the silo, the inverted placement of each tunnel section defining a downwardly-facing concave portion and an upwardly-facing convex portion, each downwardly-facing concave portion creating a cavity through which the horizontal frame section is slidably inserted.

7. The apparatus of claim 1 further comprising a plurality of conveyor crosspieces adjacent and projecting transversely from the conveyor bed, the conveyor crosspieces located between the endless linked chains and secured thereto, and conveying the material along the upper surface of the conveyor bed in conjunction with the endless linked chains.

8. The apparatus of claim 7 further comprising a means to rotate the roller member located generally at the upper reach so that slidable movement of the endless linked chain and the conveyor crosspieces on the conveyor bed results in the conveyance of corn and similar material threrealong.

9. The apparatus of claim 8 wherein the means to rotate includes a motor unit fixedly mounted generally at the upward reach of the upwardly inclined frame section and drivingly integrated with the roller member located generally at the upper reach.

10. The apparatus of claim 9 further comprising a remote motor control switch attached to the motor unit by an elongated cable for controlling the running and the operation of the motor unit.

11. The apparatus of claim 10 wherein the remote motor control switch includes a backside prong for securement to a belt or other article of clothing.

12. The apparatus of claim 1 further comprising a horizontally-extending surface roller transverse to the conveyor support sides and firmly secured thereto at the lower reach for engaging the floor of the silo and reducing friction during slidable insertion of the horizontal frame section therein.

13. The apparatus of claim 1 further comprising an elongated, cylindrical hollow alignment sleeve for removable insertion on farm machinery for facilitating insertion and relocation of the movable corn unloading apparatus.

14. The apparatus of claim 13 wherein the alignment sleeve includes a laterally-extending hollow member attached to the alignment sleeve for insertion over a downwardly projecting alignment pin and a downwardly-projecting, U-shaped member fixed to the alignment sleeve for the removable attachment of a heavy link chain.

15. The apparatus of claim 1 further comprising a pair of rigid, U-shaped chain inserts horizontally fixed to each outward surface of the conveyor support sides at a pivot point on the horizontal frame section, each chain insert further defining a slot for permitting insertion therethrough to facilitate moving and repositioning.

16. A movable corn unloading apparatus in combination with a silo having a side opening at the lower portion thereof comprising:
a specially-configured interior silo floor having a plurality of inverted, U-shaped, removable tunnel sections, the inverted tunnel sections creating a longitudinal cavity, one end being adjacent to said opening;
a horizontal frame section readily removably inserted through the said opening and into and through the said cavity of the tunnel sections, the horizontal frame section culminating at a lower reach;
an upwardly-inclined frame section attached to the horizontal frame section and culminating at an upper reach;
a stationary conveyor bed, extending from the upper reach to the lower reach for conveying corn thereon;
a pair of spaced-apart, endless linked chains adapted for slidable movement on the conveyor bed to convey the corn along the said conveyor bed;
a pair of laterally-extending guards attached to the upwardly-inclined frame section;
a pair of roller members located generally at the lower reach and the upper reach, respectively, rotatably engaging the linked chain to facilitate the slidable movement of the linked chain on the conveyor bed.

17. The apparatus of claim 16 wherein the interior floor includes a pair of oppositely-disposed sides, each side sloping inward and downward to an elongated, rectangular-shaped groove, the rectangular-shaped groove integrated within the silo floor receiving the horizontal frame section.

18. The apparatus of claim 16 wherein the specially-configured interior floor slopes radially downward and inward from a circumferential edge to a generally central converging point lower than the circumferential edge, the interior floor having a recessed, linear, concave-formed ditch extending the diameter thereof permitting slidable insertion therein of the horizontal frame section.

19. The apparatus of claim 16 further comprising a pair of U-shaped, oppositely-disposed chain inserts, each chain insert fixed to the outward support surface of each conveyor support side by a pair of prong ends to allow insertion therethrough of a chain.

* * * * *